(12) United States Patent
Maeda et al.

(10) Patent No.: US 6,930,432 B2
(45) Date of Patent: *Aug. 16, 2005

(54) ROTOR OF DYNAMO-ELECTRIC MACHINE

(75) Inventors: Naohide Maeda, Tokyo (JP); Yoshihito Asao, Tokyo (JP); Masahiko Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/790,749

(22) Filed: Mar. 3, 2004

(65) Prior Publication Data

US 2004/0174089 A1 Sep. 9, 2004

(30) Foreign Application Priority Data

Mar. 4, 2003 (JP) .................................... P2003-056499

(51) Int. Cl.[7] .............................................. H02K 12/21
(52) U.S. Cl. .................................. 310/263; 310/156.72
(58) Field of Search ................ 310/263, 156.66–156.73

(56) References Cited

U.S. PATENT DOCUMENTS 6,104,118 A * 8/2000 Kanazawa et al. .......... 310/263
6,150,746 A    11/2000 Lechner
6,201,335 B1 *  3/2001 Higashino et al. .......... 310/263
6,369,485 B1 *  4/2002 Oohashi et al. ............. 310/263
6,806,616 B2 * 10/2004 Morikaku et al. .......... 310/263
2002/0011757 A1  1/2002 Tanaka et al.
2002/0067101 A1  6/2002 Armiroli et al.

FOREIGN PATENT DOCUMENTS

EP   0 718 959 A2    6/1996
JP   P2000-139045 A  5/2000
JP   P2001-086715 A  3/2001

* cited by examiner

Primary Examiner—Tran Nguyen
(74) Attorney, Agent, or Firm—Sughrue Mion, PLLC (57) ABSTRACT

A rotor of a dynamo-electric machine according to the present invention including a pole core provided so as to cover a rotor coil generating a magnetic flux and being made up of a first pole core body and a second pole core body having respectively tooth-shaped magnetic poles projecting so as to mesh alternately with each other, includes magnet ASSYs as the magnetic element having magnets disposed on the both side surfaces of the tooth-shaped magnetic poles for reducing magnetic flux leakage from between the side surfaces of the adjacent tooth-shaped magnetic poles, and magnet retaining members for supporting the magnets on the tooth-shaped magnetic poles, and resin members filled between the magnet ASSYs at the position between the opposing surfaces thereof.

9 Claims, 8 Drawing Sheets

ROTOR OF DYNAMO-ELECTRIC MACHINE

BACKGROUND OF THE INVENTION

1. Field of the Invention

The present invention relates to a rotor of a dynamo-electric machine and, more specifically, to the structure of a rotor of an alternating current generator or an electric motor as a dynamo-electric machine for a vehicle.

2. Description of the Related Art

A rotor of a dynamo-electric machine having a rotor coil for generating a magnetic flux and a pole core made up of a first pole core body and a second pole core body provided so as to cover the rotor coil and having tooth-shaped magnetic poles projecting so as to mesh alternately with each other is widely known.

On the tooth-shaped magnetic poles, permanent magnets are attached. The object of attaching the permanent magnets to the tooth-shaped magnetic poles is to improve the output of a dynamo-electric machine by reducing magnetic flux leakage from the side surfaces of the adjacent tooth-shaped magnetic poles or from the inner peripheral surfaces thereof.

However, when the magnets are mounted, the weight of the entire tooth-shaped magnetic pole increases, and hence a centrifugal force generated by rotation of the rotor increases. In particular, when the weight at the distal ends of the tooth-shaped magnetic poles increases, deformation in the direction toward a stator increases. Therefore, it is necessary to increase an air gap between the rotor and the stator. However, the air gap is critical for the output, and the output increases as the air gap decreases.

Therefore in order to achieve further improvement of the output, it is necessary to fix the magnets so as to restrain deformation of the tooth-shaped magnetic poles.

There is provided a magnet retaining member for mounting the magnet to the tooth-shaped magnetic pole (For example, see JP-A-2001-086715). However, this magnet retaining member also has a risk that the magnet retaining member or the magnet itself may become damaged or may deviated due to increase in deformation of the tooth-shaped magnetic pole or vibration of the tooth-shaped magnetic pole caused by variations in the revolving number of the rotor.

In order to cope with this problem, in the related art, it is contemplated to absorb the movement of the magnets due to the centrifugal force by securing the magnets, which are mounted to the side surfaces of the respective adjacent tooth-shaped magnetic poles, with respect to each other with adhesive layers having high flexibility.

However, since the magnets are secured directly by the adhesive layers, a stress is exerted directly to the magnets.

In addition, a measure to insert flat plates having higher flexibility than the magnet between the tooth-shaped magnetic poles as the retaining members is also proposed (For example, see JP-A-2000-139045). However, since the plates having higher flexibility than the magnet are used for covering, the effect for preventing deformation of the magnets or the magnetic poles is insufficient.

Furthermore, in the related art in which the magnets are fixed to the tooth-shaped magnetic poles using the magnetic retaining members, a measure to constrain deformation by forming the retaining members into a shape which can receive a moment of the magnet generated during rotation or, at a high-speed revolution, by configuring the retaining members to come into contact with each other has been studied.

However, since the adjacent magnetic poles are not restrained in the radial direction directly, radially outward deformation increases (For example, see JP-A-2001-086715).

SUMMARY OF THE INVENTION

It is an object of the present invention to provide a rotor of a dynamo-electric machine in which circumferential deformation of tooth-shaped magnetic poles having magnetic elements for preventing magnetic flux leakage disposed thereon can be restrained accurately and strength against decomposition in the axial direction may reliably be increased. The invention provides a rotor of a dynamo-electric machine including a pole core made up of a first pole core body and a second pole core body each having tooth-shaped magnetic poles projecting so as to mesh alternately with each other, further includes magnetic elements having magnets disposed on both sides of the tooth-shaped magnetic poles for reducing magnetic flux leakage from between the side surfaces of the adjacent tooth-shaped magnetic poles, magnet retaining members for supporting the magnets onto the tooth-shaped magnetic poles, and resin members provided between the magnetic elements so as to fill the space between the opposing side surfaces thereof. Consequently, according to the invention, there is provided a rotor of a dynamo-electric machine in which circumferential deformation of the tooth-shaped magnetic poles having the magnetic elements for preventing magnetic flux leakage disposed thereon can be restrained accurately, and strength against decomposition in the axial direction can be increased reliably.

The foregoing and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
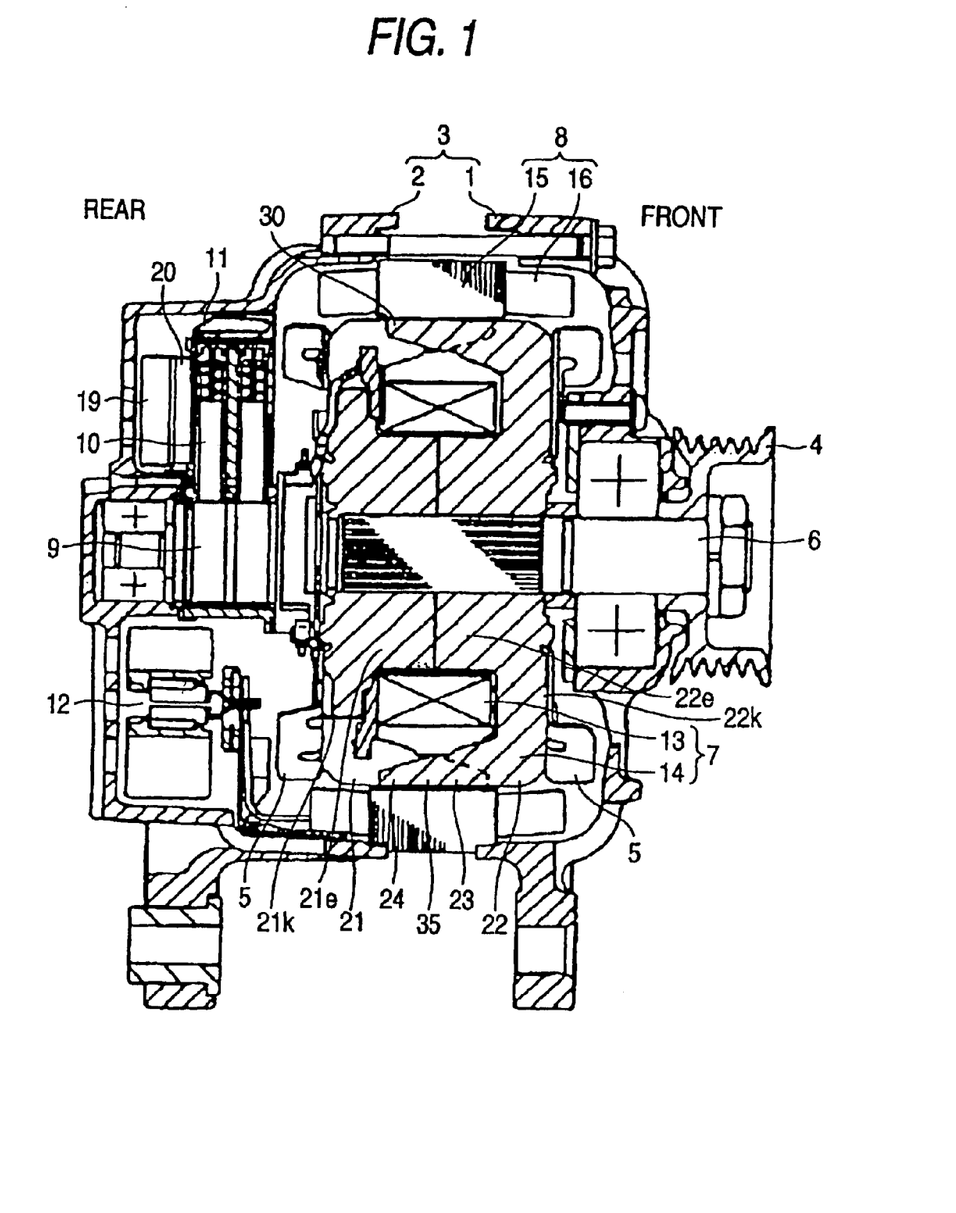
FIG. 1 is a cross-sectional side view showing the structure of a rotor according to a first embodiment of the present invention.
Figure 2:
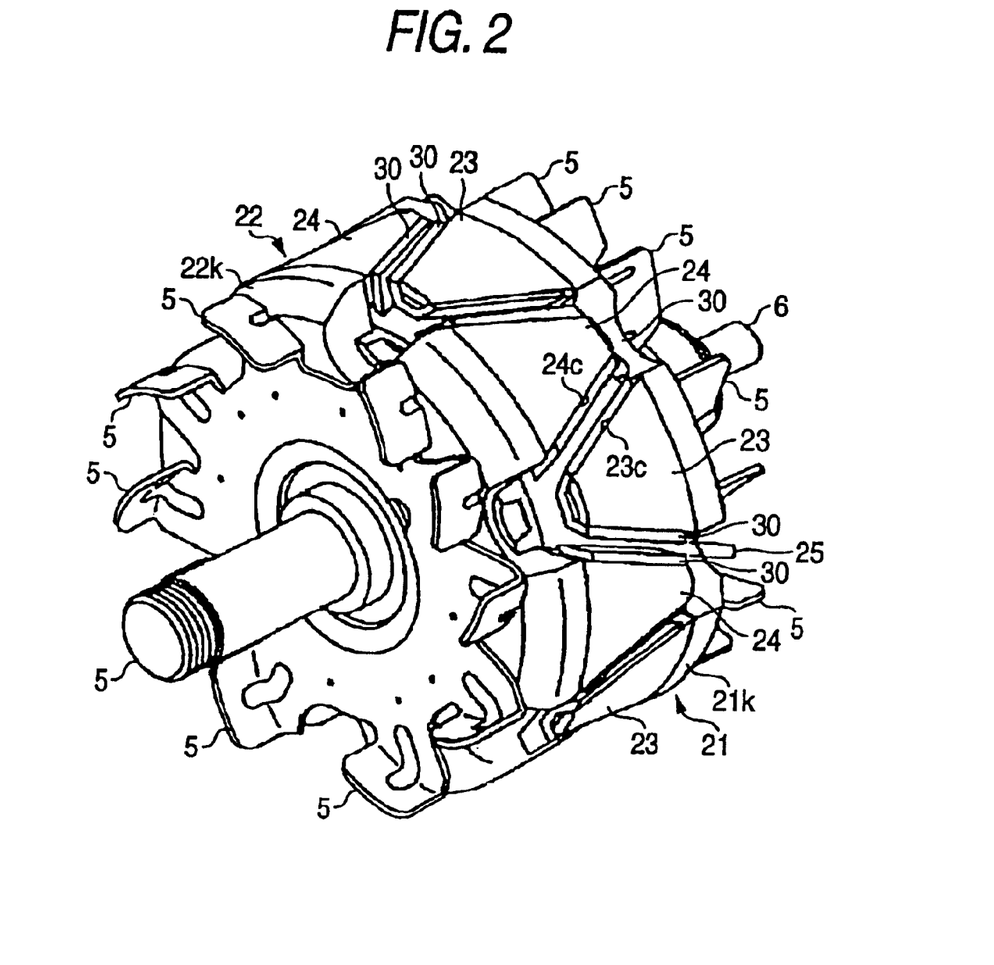
FIG. 2 is a perspective view showing the structure of the rotor according to the first embodiment of the present invention.
Figure 3:
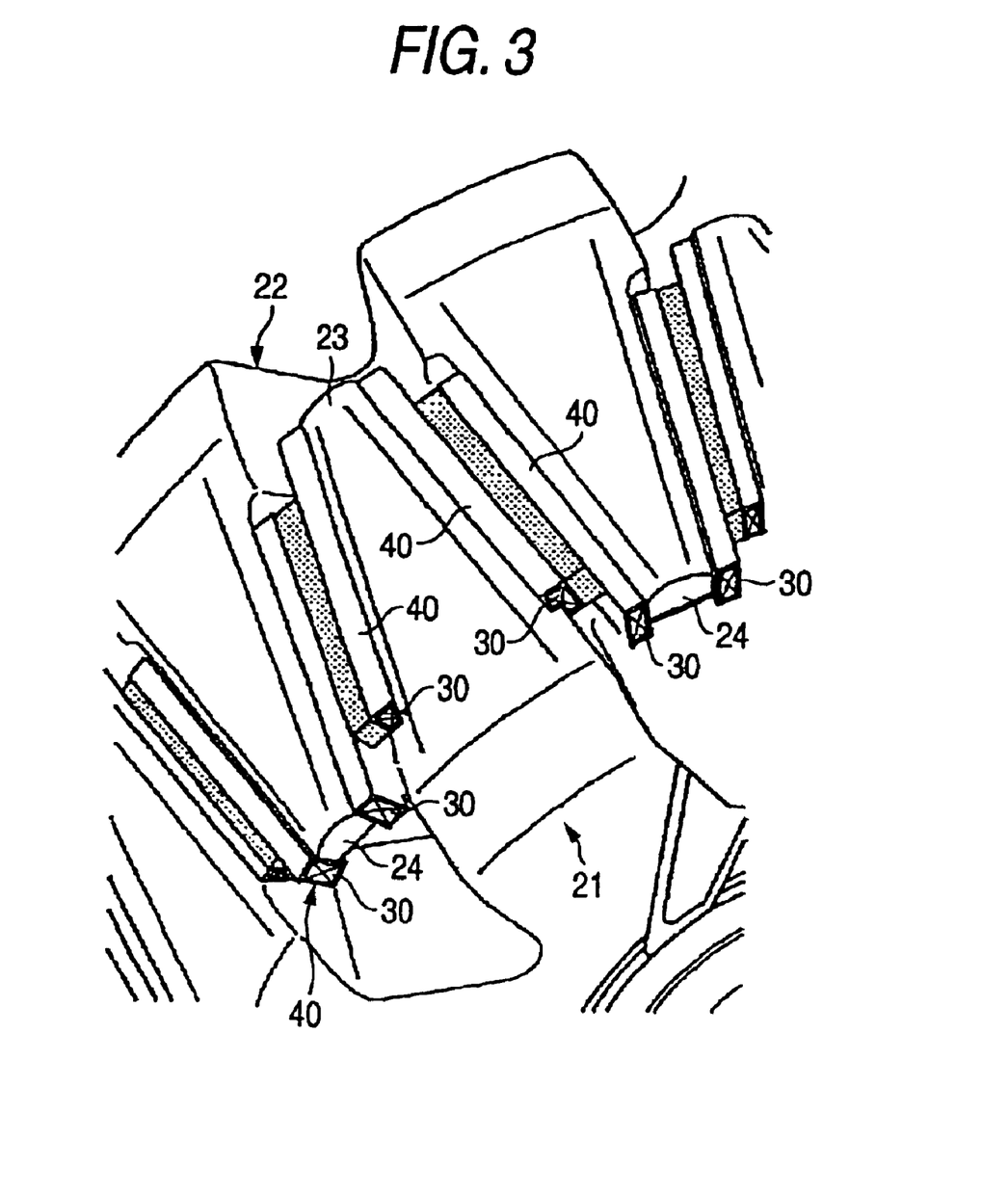
FIG. 3 is a perspective view of a principal portion of the rotor according to the first embodiment of the present invention.
Figure 4:
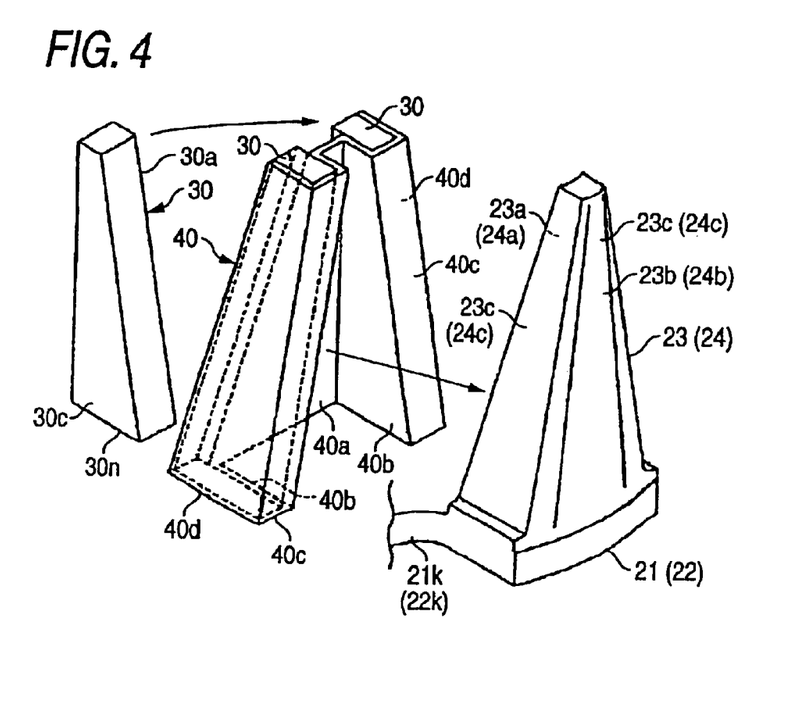
FIG. 4 is a side view of the rotor according to the first embodiment of the present invention in a state of being disassembled into parts.
Figure 5:
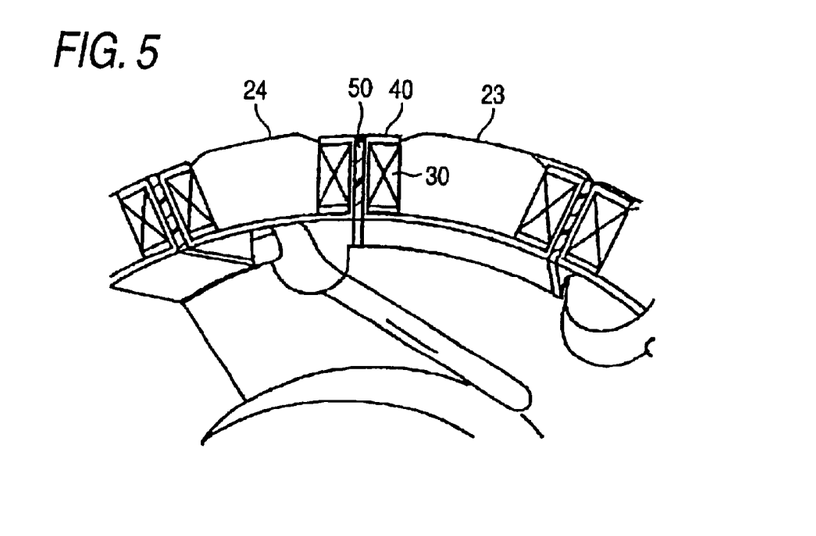
FIG. 5 is a cross-sectional view of the rotor according to the first embodiment of the present invention taken along the plane perpendicular to a pole axis of tooth-shaped magnetic poles.

Referring now to FIG. 1 to FIG. 5, a first embodiment of the present invention will be described. FIG. 1 to FIG. 5 show the case in which the structure of a rotor according to the first embodiment of the present invention is applied to a rotor of a dynamo-electric machine for a vehicle. FIG. 1 is a cross-sectional side view showing the structure of the rotor. FIG. 2 is a perspective view showing the structure of the rotor. FIG. 3 is a perspective view showing a principal portion of the rotor. FIG. 4 is a side view showing a state in which the rotor is disassembled into parts. FIG. 5 is a cross-sectional view taken perpendicularly to a pole axis of tooth-shaped magnetic poles of the rotor.

As shown in FIG. 1, the dynamo-electric machine for a vehicle includes a case 3 having a front bracket 1 and a rear bracket 2 formed of aluminum, a shaft 6 provided in the case 3 and having a pulley 4 fixed at one end thereof, a Randle-type rotor 7 fixed to the shaft 6, fans 5 fixed on both end surfaces of the rotor 7, a stator 8 fixed on the inner wall surface of the case 3, a slip ring 9 fixed to the other end of the shaft 6 for supplying a current to the rotor 7, a pair of brushes 10 sliding along the slip ring 9, a brush holder 11 in which the brush 10 is stored, a rectifier 12 for rectifying an alternating current generated at the stator 8 electrically connected to the stator 8 into the direct current, a heat sink 19 fitted to the brush holder 11, and a regulator 20 attached to the heat sink 19 for regulating the magnitude of an alternating current voltage generated at the stator 8.

The rotor 7 includes a cylindrical rotor coil 13 for generating a magnetic flux by flowing an electric current, and a pole core 14 provided so as to cover the rotor coil 13 and on which magnetic poles are formed by the magnetic flux. The stator 8 includes a stator core 15, and a stator coil 16 is wound around the stator core 15 and generates an alternating current by variations in the magnetic flux generated by the rotor coil 13 in association with the rotation of the rotor 7.

The pole core 14 includes a pair of first and second pole core bodies 21, 22 meshed with each other. The pole core body 21 and the pole core body 22 are normally formed of iron, and include cylindrical portions 21e, 22e on which the rotor coil 13 is wound, and disk-shaped base portions 21K, 22K from which the cylindrical portions 21e, 22e project. The outer edges of the base portions 21k, 22k are formed with a plurality of tooth-shaped magnetic poles 23, 24, respectively, meshing with each other at the position between the outer periphery of the rotor coil 13 and the inner periphery of the stator 8.

As shown in FIG. 4, the thickness and the width of the tooth-shaped magnetic poles 23, 24 described above are large on the side of the base portions 21k, 22k, and decrease toward the distal ends thereof. The inner peripheral surfaces 23a, 24a of the tooth-shaped magnetic poles 23, 24 are reduced in thickness toward the distal ends thereof, and the outer peripheral surfaces 23b, 24b thereof are arcuate in shape along the inner peripheral surface of the stator 8.

The tooth-shaped magnetic poles 23, 24 have two trapezoidal side surfaces 23c, 24c along the outer periphery of the rotor 7. Since the tooth-shaped magnetic poles 23, 24 can be meshed alternately with the distal ends faced each other, the inner peripheral surfaces 23a, 24a of the tooth-shaped magnetic poles 23, 24 are arranged circumferentially so as to incline alternately.

The side surfaces 23c, 24c of the tooth-shaped magnetic poles 23, 24 are inclined toward the center of the tooth-shaped magnetic poles 23, 24 so as to be tapered from the proximal ends to the distal ends thereof.

In addition, secured between the adjacent tooth-shaped magnetic poles 23, 24 are rectangular solid magnets 30 magnetized in the direction to reduce magnetic flux leakage between the opposed surfaces 23c, 24c by means of retaining members 40 (FIG. 3, FIG. 4) for alleviating the centrifugal force.

The operation will be described below.

A current is supplied from a battery (not shown) to the rotor coil 13 through the brush 10 and the slip ring 9 and hence a magnetic flux is generated. Then, the tooth-shaped magnetic poles 23 of the first pole core body 21 are magnetized into N pole, and the tooth-shaped magnetic poles 24 of the second pole core body 22 are magnetized into S pole.

On the other hand, since the pulley 4 is rotated by a rotational force of the engine and the rotor 7 is rotated by the shaft 6, an electro-motive force is generated on the stator coil 16. The AC electro-motive force is rectified into a direct current through the rectifier 12, adjusted in magnitude by the regulator 20, and charged into a battery (not shown).

As shown in FIG. 3 and FIG. 4, two each of magnet bodies formed of neodymium magnets 30 magnetized so as to reduce magnetic flux leakage from between the tooth-shaped magnetic poles and mounted to the side surfaces of the tooth-shaped-magnetic poles 23, 24 are arranged on the inner peripheral surfaces 23a of tooth-shaped magnetic poles 23 and on the inner peripheral surfaces 24a of the tooth-shaped magnetic poles 24.

The magnets 30 are retained by the magnet-retaining member 40, and the magnets 30 and the magnet retaining member 40 configure a magnetic element made up of a magnet ASSY 41 and are supported by the tooth-shaped magnetic poles 23, 24. The magnet retaining member 40 can be manufactured easily by bending a stainless steel (SUS304) plate of 0.5 mm in thickness.

The shape of the magnet ASSY 41 is a trapezoidal column with the side surface of the tooth-shaped magnetic poles extended along the magnetic pole. The magnet ASSY 41 employs an adhesive agent or the like for fixing the tooth-shaped magnetic poles 23, 24.

Since the tooth-shaped magnetic poles 23, 24 and the magnet retaining members 40 are both formed of metal, they may be fixed by welding.

A reinforcing member 40 is, as shown in FIG. 4, formed into substantially M-shape in cross section taken along the axis of the rotor 7, and includes an inner peripheral portion 40a of a planar trapezoidal shape along the inner peripheral surfaces 23a, 24a of the tooth-shaped magnetic poles 23, 24, bent portions 40b bent from both edges of the inner peripheral portion 40a radially outwardly so as to extend along the both side surfaces 23c, 24c of the tooth-shaped magnetic poles 23, 24, pressing portions 40c bent from the distal ends of the bent portions 40b along the outer peripheries of the magnets 30 for pressing the outer peripheries thereof, and folded portions 40d folded from the pressing portions 40c along the side surfaces of the magnets 30.

The magnets 30 are embraced by these bent portions 40b, pressing portions 40c and folded portions 40d, and are clamped by the bent portions 40b and the folded portions 40d from the outer peripheral side to be retained on the side of the inner periphery of the reinforcing member 40.

As shown in FIG. 4, the inner peripheral portion 40a and the bent portions 40b, 40b on both sides thereof have such a shape that the distal ends of the bent portions 40b, 40b open out so that the length P on the side of the outer periphery becomes larger than the length Q of the inner peripheral side, and formed into a substantially U-shape. The bent portion 40b, the pressing portion 40c, and the folded portion 40d of the reinforcing member 40 embracing the magnet 30 are formed into an inverted U-shape extending along the outline of the cross-section of the magnet 30. In other words, the magnets 30 are disposed respectively on the side surfaces 23c, 24c of the tooth-shaped magnetic poles 23, 24 so as to be inclined from the center lines of the tooth-shaped magnetic poles 23, 24 passing through the center of a revolving shaft. 7p of the rotor 7 in the direction opening out toward the outer peripheral surfaces 23b, 24b.

It is not necessary to provide a retaining portion with respect to the tooth-shaped magnetic poles 23, 24, as shown in FIG. 4, and side surfaces 30c thereof are a trapezoidal shape extending along the side surfaces 23c, 24c of the tooth-shaped magnetic poles 23, 24. The magnet has a truncated quadrangular pyramid having the width being almost constant and the thickness increasing from a distal end 30s toward a proximal end 30n. The magnet 30 may be a rectangular solid shape.

In this manner, an adhesive agent or the like is used for retaining the magnets 30 in the reinforcing members 40 and fixing them to the tooth-shaped magnetic poles 23, 24. In other words, the adhesive agent is applied on the boundaries of the inner peripheral portions 40a of the reinforcing members 40 with respect to the inner peripheral surfaces 23a, 24a of the tooth-shaped magnetic poles 23, 24, and the boundaries of magnets 30 with respect to the bent portions 40b, the pressing portions 40c, and the folded portions 40d of the reinforcing member 40.

By mounting the magnet. ASSYs 41 as described above to the tooth-shaped magnetic poles 23, 24 respectively, magnet flux leakage from between the tooth-shaped magnetic poles can be alleviated, and hence improvement of output is achieved.

However, in this state, a centrifugal force corresponding to the weight of the magnet ASSYs 41 is exerted to the tooth-shaped magnetic poles 23, 24 when rotating, and hence the tooth-shaped magnetic poles 23, 24 tend to open radially outward.

Therefore, as shown in FIG. 3, by filling and firmly fixing resin members 50 between the opposed surfaces of the magnet ASSYs 41, the tooth-shaped magnetic poles 23, 24 become resistant to the centrifugal force exerted thereto. By providing resin between the opposed surfaces of the magnet ASSYs 41, even though it is resin, the centrifugal force exerted to the magnet ASSYs 41 and the tooth-shaped magnetic poles 23, 24 are received by the entire opposed surfaces, and hence resistance against the high-speed revolution can be improved. In addition, since a stress is received by the magnet retaining members 40, the magnets 30 can be prevented from becoming damaged. The magnets 30 can also be fixed more firmly against a force exerted in the axial direction.

Consequently, the air gap between the rotor 7 and the stator, which has strong ties with output, can be set to a value smaller than the case where only the magnet ASSYs 41 are employed.

With such arrangement, improvement of output of the dynamo-electric machine is achieved.

As described thus far, according to the first embodiment of the present invention includes the rotor coil 13 for generating a magnetic flux and the pole core 14 including the first pole core body 21 and the second pole core body 22 formed so as to cover the rotor coil 13 and having the tooth-shaped magnetic poles 23, 24 projecting therefrom so as to mesh alternately with each other, the magnet ASSYs 41 having the magnets 30 disposed on the side surfaces of the tooth-shaped magnetic poles 23, 24 for reducing magnetic flux leakage from between the tooth-shaped magnetic poles 23, 24, the magnet retaining members 40 for fixing the magnets 30 to the tooth-shaped magnetic poles 23, 24, and further, resin layers for connecting firmly between the adjacent magnet ASSYs 41 with each other. Therefor, strength of the magnets ASSY 41 is improved in comparison with the case of employing only the normal magnet ASSYs 41. It is because the centrifugal force exerted to the magnet ASSY 41 and the tooth-shaped magnetic poles 23, 24 is received by the entire opposing surfaces by providing the resin layers 50 therebetween. In addition, since the stress is received by the magnet retaining members 40, the magnets are prevented from becoming damaged.

As a consequence, opening out of the tooth-shaped magnetic poles 23, 24 radially outwardly may be reduced even at a high-speed revolution, and the air gap between the rotor and the stator may be reduced correspondingly, whereby the output may be improved.

According to the first embodiment of the present invention, in the rotor of a dynamo-electric machine including the rotor coil 13 for generating the magnetic flux and the pole core 14 provided so as to cover the rotor coil 13 and having the first pole core body 21 and the second pole core body 22 formed with the tooth-shaped magnetic poles 23, 24 projecting therefrom so as to mesh alternately with each other, there is provided the magnet ASSYs 41 as the magnet elements including the magnets 30 disposed on both sides of the tooth-shaped magnetic poles 23, 24 for reducing magnetic flux leakage from between the adjacent tooth-shaped magnetic poles 23, 24, magnet retaining members 40 each having the bent portions 40b, the pressing portions 40c, and the folded portions 40d for embracing the magnets 30 from the outer peripheral sides of the magnets 30, and the trapezoidal plate shaped inner peripheral surface 40a for supporting the magnets 30 onto the tooth-shaped magnetic poles 23, 24, and the resin members 50 filled between the magnet ASSYs 41 as the magnet elements at the positions between the opposed surfaces thereof. Therefore, the rotor of a dynamo-electric machine in which circumferential deformation of the tooth-shaped magnetic poles having the magnet elements for preventing magnetic flux leakage can be restrained accurately, and strength against decomposition in the axial direction can be increased reliably.

Second Embodiment

Figure 6:
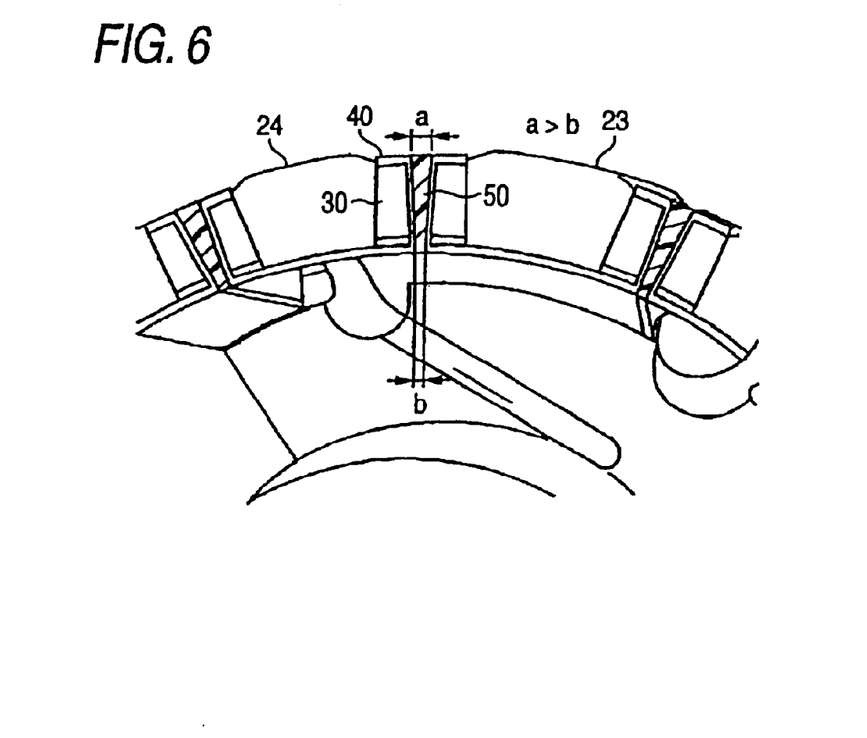
FIG. 6 is an enlarged cross-sectional view of the rotor according to a second embodiment of the present invention taken along the peripheral surface of the rotor showing the structure of the two adjacent tooth-shaped magnetic poles and a magnet ASSYs.

FIG. 6 is an enlarged cross-sectional view of the rotor according to a second embodiment of the present invention taken along the peripheral surface of the rotor showing the structure of the two adjacent tooth-shaped magnetic poles and the magnet ASSY.

In the second embodiment, configurations other than the specific configuration described here are the same as those in the first embodiment described above and provide the same effects. The identical reference numerals represent the identical or corresponding parts in the drawing.

As shown in FIG. 6, in comparison with the first embodiment, the second embodiment is configured in such a manner that the distance between the side surfaces of the magnet ASSYs 41 facing each other is such that a distance a on the side of the outer periphery is wider than a distance b on the side of the inner periphery, that is, (a>b) shape, so that when injecting resin, resin can easily spread therein toward the inner periphery.

By allowing resin to spread easily, resin is infallibly spread between the magnet ASSYs 41, and deformation of the outer peripheral surface is restrained. In addition, the amount of resin used may be reduced.

Accordingly, the air gap between the rotor 7 and the stator 8 may be reduced, whereby improvement of output of a dynamo-motor machine, which is the main object of the present invention, is achieved.

In the second embodiment 2 of the present invention, the opposed surfaces between the magnet ASSYs are inclined so that the distance therebetween is larger on the side of the outer periphery and is smaller on the side of the inner periphery. In this arrangement, resin can easily be filled between the opposing surfaces. Accordingly, resin can be filled infallibly in the filling step to secure strength, and the amount of resin to be used may be reduced.

According to the second embodiment of the present invention, in addition to the configuration in the first embodiment, the distance between the opposed surfaces of the adjacent magnet ASSYs 41 as the magnetic element is set to be wider on the side of the outer periphery of the rotor than on the side of the inner periphery. Therefore, there is provided a rotor of a dynamo-electric machine in which circumferential deformation of the tooth-shaped magnetic poles having the magnetic elements for preventing magnetic flux leakage disposed thereon can be restrained accurately, and hence strength against decomposition in the axial direction can be reliably increased, the resin member 50 can be filled infallibly to secure its strength, and the amount of resin used for the resin member 50 may be reduced, whereby adequate filling operation is achieved.

Third Embodiment

Figure 7:
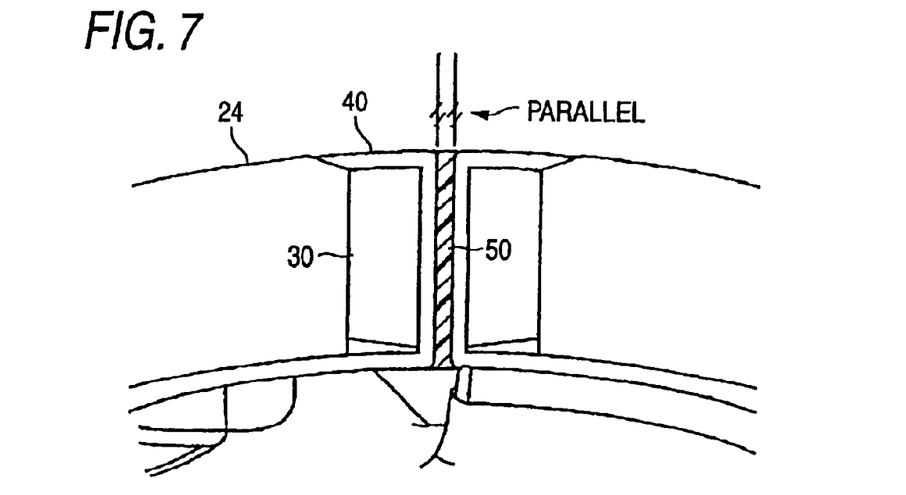
FIG. 7 is an enlarged cross-sectional view of the rotor according to a third embodiment of the present invention taken along peripheral surface of the rotor showing the structure of the two adjacent tooth-shaped magnetic poles and the magnet ASSYs.

Referring now to FIG. 7, a third embodiment of the present invention will be described. FIG. 7 is an enlarged cross-sectional view of the rotor according to the third embodiment of the present invention taken along peripheral surface of the rotor showing the structure of the two adjacent tooth-shaped magnetic poles and the magnet ASSYs.

In the third embodiment, configurations other than the specific configuration described here are the same as those in the first embodiment described above and provide the same effects. The identical reference numerals represent the identical or corresponding parts in the drawing.

As shown in FIG. 7, the third embodiment is configured in such a manner that the opposing side surfaces of the magnet ASSYs 41 are disposed in parallel so that resin between the magnet ASSYs 41 can be spread evenly. By allowing the resin to be spread evenly, strength of fixation is increased, and hence deformation of the tooth-shaped magnetic poles 23, 24 can be restrained. In addition, since the resin is spread evenly, time required for hardening process such as thermal hardening may be considered to be the same, and hence reduction of time for processing or setting of strength conditions may easily be performed.

In the third embodiment of the present invention, since the opposing surfaces of the magnet ASSYs are parallel with each other as shown in FIG. 7, the resin can be filled evenly on the side surface, and hence strength can be increased. In addition, since it is filled evenly, it is considered that hardening process such as thermal hardening can be completed within the same period as a whole, and hence setting the optimal processing time or setting of strength condition can easily be performed.

In addition to the configuration of the first embodiment, according to the third embodiment of the present invention, the opposed surfaces of the adjacent magnet ASSYs 41 as the magnetic elements are disposed in parallel. Therefore, there is provided a rotor of a dynamo-electric machine in which circumferential deformation of the tooth-shaped magnetic poles having the magnetic elements for preventing magnetic flux leakage disposed thereon can reliably be restrained, strength against decomposition in the axial direction can reliably be increased, and the filling operation of the resin member 50 can be performed smoothly.

Fourth Embodiment

Figure 8:
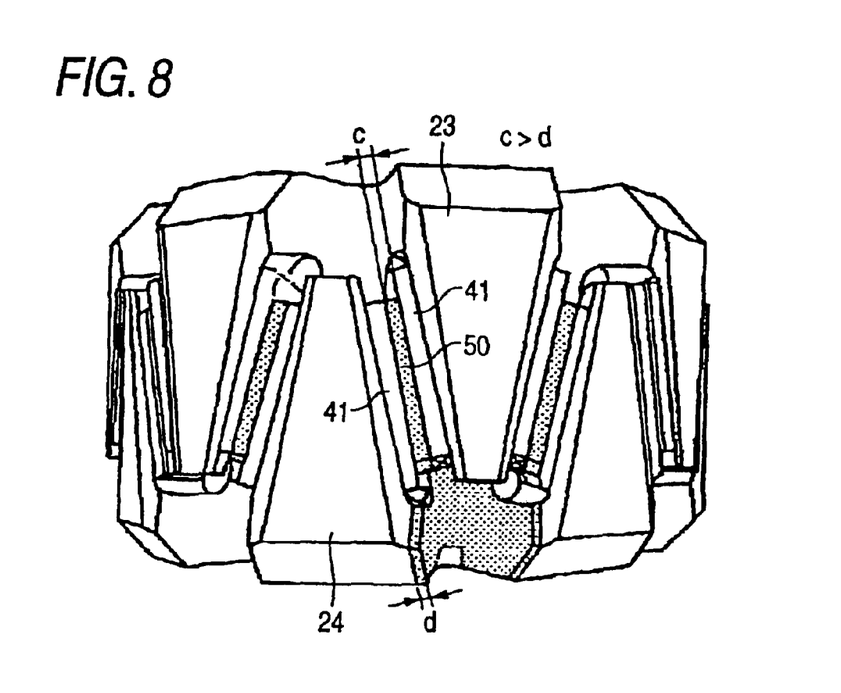
FIG. 8 is a perspective view of the rotor according to a fourth embodiment of the present invention showing the structure of the two adjacent tooth-shaped magnetic poles and the magnet ASSYs.

Referring now to FIG. 8, a fourth embodiment of the present invention will be described. FIG. 8 is a perspective view of the rotor according to the fourth embodiment of the present invention showing the structure of the two adjacent tooth-shaped magnetic poles and the magnet ASSYs.

In the fourth embodiment, configurations other than the specific configuration described here are the same as those in any one of the first embodiment to the third embodiment and provide the same effects. The identical reference numerals represent the identical or corresponding parts in the drawing.

As shown in FIG. 8, the fourth embodiment is adapted in such a manner that a thickness c of the resin layers of the resin members 50 filled between the opposed surfaces of the magnet ASSYs 41 is larger than a thickness d of the resin layer formed of resin leaked from between the opposed surfaces at the portions other than between the opposed surfaces of the magnet ASSYs 41 (c>d).

When filling the resin between the opposed surfaces, such filling operation is performed in a state in which the rotor pole is assembled. Therefore, filling the resin only between the opposed surfaces is not realistic in terms of productivity.

Therefore, waste of the resin may be reduced by taking into account the fact that the resin tends to leak to some extent and controlling the amount of leakage of the resin by control of filling machine or a jig so that the amount of leakage of the resin does not exceed the amount filled between the opposed surfaces, and hence the effects of the resin can be demonstrated efficiently.

In other words, the thickness c of the resin layer of the resin member 50 filled between the opposed surfaces of the magnet ASSYs 41 is set to the value larger than the thickness d of the resin layer formed of the resin leaked from between the opposed surfaces at the portion other than between the opposed surfaces (c>d).

There is a case in which the resin is applied to all over the rotor as an insulating measure for the rotor coil. In this case as well, the amount of resin between the opposed surfaces of the magnet ASSYs 41 is to be larger than that at other portions.

In the fourth embodiment of the present invention, the amount of leakage of resin is reduced by controlling the amount of resin to be filled between the opposed surfaces of the magnet ASSYs or by using an auxiliary jig.

As a consequence, the amount of the resin required for production may also be reduced, and hence the cost reduction is achieved.

In addition to the configuration of any one of the first embodiment to the third embodiment, the fourth embodiment of the present invention is configured in such a manner that the thickness of the resin layer formed between the opposed surfaces of the magnet ASSYs 41 as the magnetic elements by filling the resin member 50 is larger than the thickness of the resin formed at other portions. Therefore, there is provided a rotor of a dynamo-electric machine in which circumferential deformation of the tooth-shaped magnetic poles having the magnetic element for preventing magnetic flux leakage disposed thereon can be restrained accurately, strength against decomposition in the axial direction can be reliably increased, and the amount of resin required for production may be reduced.

Fifth Embodiment

A fifth embodiment of the present invention will be described.

In the fifth embodiment, configurations other than the specific configuration described here are the same as those in any one of the first embodiment to fourth embodiment and provide the same effects. The identical reference numerals represent the identical or corresponding parts in the drawing.

In the fifth embodiment, by providing the magnet retaining member 40 constituting the magnet ASSYs 41 as the magnetic elements a surface roughness of 6S or below, the surface area of the resin to be fixed is increased, and hence enhancement of strength of fixation by fixing the resin is achieved.

In the fifth embodiment of the present invention, by providing the magnet retaining members 40 a surface roughness of 6S or below, the surface area fixed by the resin is increased, and hence stronger fixation is achieved.

In addition to the configuration of any one of the first embodiment to the fourth embodiment, according to the fifth embodiment of the present invention, fixation between the magnet ASSYs 41 and the resin members 50 is reinforced by increasing the surface roughness of the folded portions 40d (FIG. 4) of the magnet retaining members 40 constituting the magnet ASSYs 41 as the magnetic elements. Therefore, there is provided a rotor of a dynamo-electric machine in which circumferential deformation of the tooth-shaped magnetic poles having the magnetic elements for preventing magnetic flux leakage disposed thereon can reliably be restrained, strength against decomposition in the axial direction can be reliably increased, and the magnet retaining members 40 constituting the magnet ASSYs 41 as the magnetic elements can be fixed firmly.

Sixth Embodiment

Figure 9:
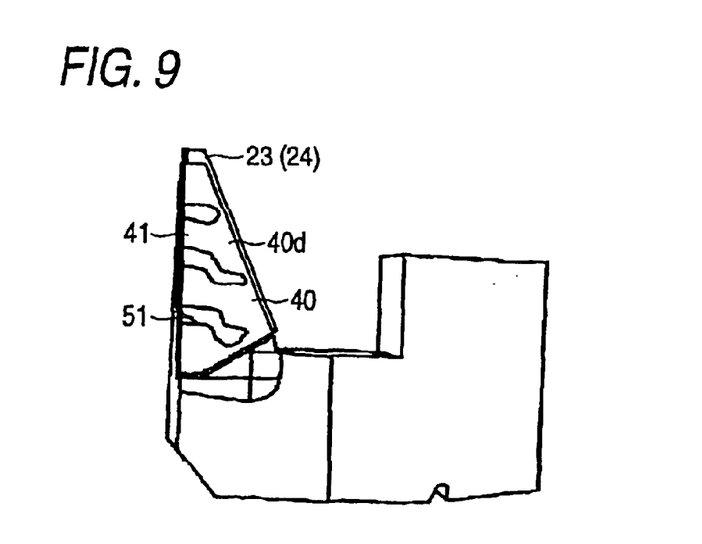
FIG. 9 is an enlarged drawing of the rotor according to a sixth embodiment of the present invention showing the structure of the tooth-shaped magnetic poles and the magnet ASSYs.

Referring now to FIG. 9, a sixth embodiment of the present invention will be described. FIG. 9 is an enlarged drawing of the rotor according to the sixth embodiment of the present invention showing the structure of the tooth-shaped magnetic poles and the magnet ASSYs.

In the sixth embodiment, configurations other than the specific configuration described here are the same as those in any one of the first to the fifth embodiments and provide the same effects. The identical reference numerals represent the identical or corresponding parts in the drawing.

In the sixth embodiment, as shown in FIG. 9, entrance of the resin member 50 between the magnet ASSYs 41 is ensured by forming grooves 51 on the surface of the folded portions 40d (FIG. 4) of the magnet retaining members 40 constituting the side portions of the magnet ASSYs 41.

As a consequence, the resin can easily be spread out and simultaneously the resin is prevented from running down by receiving the resin in the grooves 51 after the resin members 50 have been spread.

In this arrangement, since the resin member 50 can be spread out and fixed infallibly, strength of the rotor 7 is secured.

Accordingly, the air gap between the rotor 7 and the stator 8 may be reduced.

In the sixth embodiment of the present invention, as shown in FIG. 6, by forming the grooves 51 on the side surfaces of the magnet ASSYs 41, filling of the resin member 50 between the magnet ASSYs 41 is facilitated.

In addition, it makes filling of the resin member 50 easy and, simultaneously, prevents the resin running down after filling process by receiving the resin in the grooves.

In this arrangement, the resin member 50 can be spread and fixed infallibly, whereby strength of the rotor can be secured.

Furthermore, waste of resin is reduced, and the cost may be reduced correspondingly.

In addition to the configuration according to any one of the first embodiment to the fifth embodiment, according to the sixth embodiment of the present invention, easy entrance of the resin member 50 between the magnet ASSYs 40 as the magnetic elements is ensured by forming the grooves 51 on the folded portions 40d (FIG. 4) of the magnet retaining members 40 constituting the side surfaces of the magnet ASSYs 41 as the magnetic elements. Therefore, there is provided a less-expensive rotor of a dynamo-electric machine in which circumferential deformation of the tooth-shaped magnetic poles having the magnetic element for preventing magnetic flux leakage disposed thereon can be restrained accurately, strength against decomposition in the axial direction can be reliably increased, strength of the rotor is secured, and the air gap between the rotor and the stator may be reduced, whereby improvement of output is achieved.

Seventh Embodiment

Figure 10:
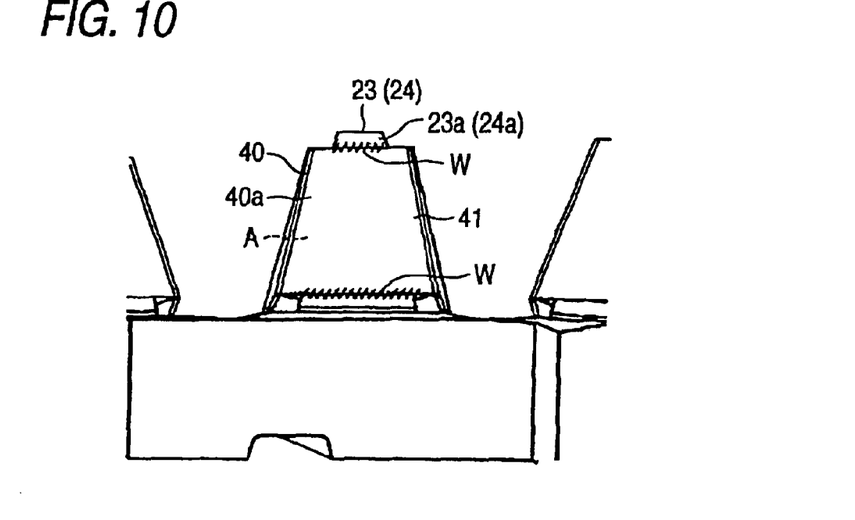
FIG. 10 is an enlarged view of the peripheral surface of a pole showing the structure of the two adjacent tooth-shaped magnetic poles and the magnet ASSYs of the rotor according to a seventh embodiment of the present invention.

Referring now to FIG. 10, a seventh embodiment of the present invention will be described. FIG. 10 is an enlarged view of the peripheral surface of pole showing the structure of the two adjacent tooth-shaped magnetic poles and the magnet ASSYs of the rotor.

In the seventh embodiment, configurations other than the specific configuration described here are the same as those in any one of the first embodiment to the sixth embodiment and provide the same effects. The identical reference numerals represent the identical or corresponding parts in the drawing.

In the seventh embodiment, as shown in FIG. 10 which is a drawing of the tooth-shaped magnetic poles 23, 24 when viewed from the inner peripheral side, when the magnet retaining members 40 of the magnet ASSYs 41 are fixed to the tooth-shaped magnetic poles 23, 24, they are fixed on the side of the inner peripheries of the tooth-shaped magnetic poles 23, 24.

As one of the methods, fixation may be achieved by applying an adhesive agent or the like between the inner peripheral surfaces 23a, 24a of the tooth-shaped magnetic poles 23, 24 and the trapezoidal plate shaped inner peripheral portions 40a of the magnet retaining members 40 and forming a planar adhesive layer A.

Alternatively, fixation may be achieved by welding the inner peripheral surfaces 23a, 24a of the tooth-shaped magnetic poles 23, 24 and the trapezoidal plane shaped inner peripheral portions 40a of the magnet retaining members 40 and forming a welding layer W. With such fixation and the effect of the resin, a rotor which is further resistant against deformation may be obtained, whereby the air gap between the rotor 7 and the stator 8 may be reduced, and hence the improved output is achieved.

In the seventh embodiment of the present invention, as shown in FIG. 10, when fixing the magnet ASSYs 41 to the tooth-shaped magnetic poles 23, 24, since there are the magnets provided on the side surfaces, the magnet retaining members 40 are fixed to the inner peripheral sides of the tooth-shaped magnetic poles 23, 24.

Fixation may be done by applying the adhesive agent to the magnet ASSYs 41 or, since the tooth-shaped magnetic poles and the magnet ASSYs are formed of metal, fixation may be done by welding.

As a consequence, the rigidity of the rotor may be increased by filling the resin between the opposed surfaces of the magnet ASSYs 41 and fixing the magnet ASSYs 41 to the tooth-shaped magnetic poles 23, 24, and hence deformation of the rotor can be restrained.

Therefore, the air gap between the rotor and the stator may be reduced and hence improvement of output is achieved.

In addition to the configurations of any one of the first embodiment to the sixth embodiment, according to the seventh embodiment of the present invention, the trapezoidal plane shaped inner peripheral portion 40a of the magnet retaining member 40 of the magnet ASSYs 41 as the magnetic elements and the inner peripheral surfaces 23a, 24a of the tooth-shaped magnetic poles 23, 24 are secured in an adhered state. Therefore, there is provided a rotor of a dynamo-electric machine in which circumferential deformation of the tooth-shaped magnetic poles having the magnetic elements for preventing magnetic flux leakage disposed thereon can be restrained accurately, strength against decompression in the axial direction can be reliably increased, and the air gap between the rotor and the stator by restraining deformation of the rotor may be reduced, whereby improvement of output is achieved.

Eighth Embodiment

Figure 11:
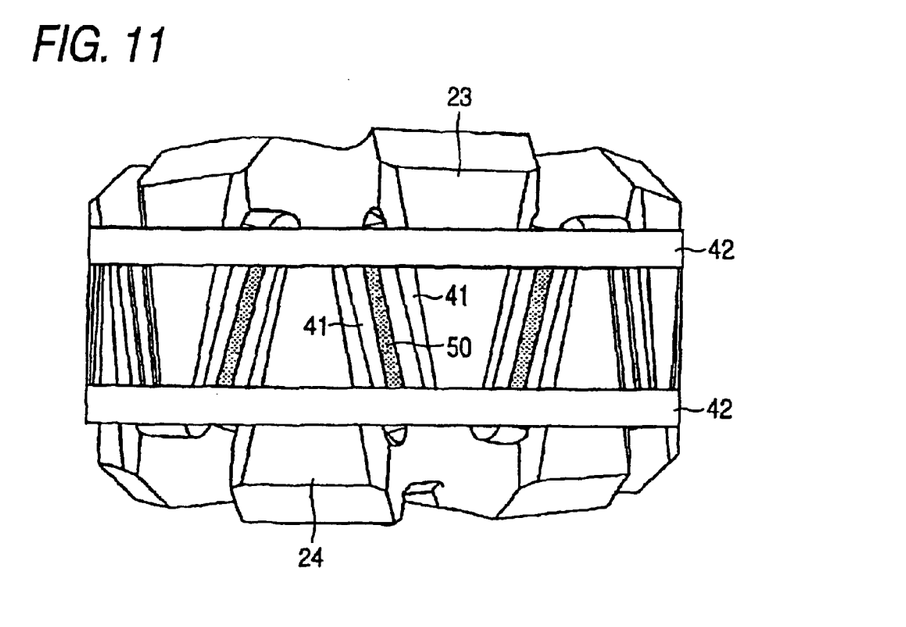
FIG. 11 is a perspective view of the structure of the rotor according to an eighth embodiment of the present invention.

Referring now to FIG. 11, an eighth embodiment of the present invention will be described. FIG. 11 is a perspective view showing the configuration of the rotor.

In the eighth embodiment, configurations other than the specific configuration described here are the same as those in any one of the first to the seventh embodiments and provide the same effects. The identical reference numerals represent the identical or corresponding parts in the drawing.

In the eighth embodiment, as shown in FIG. 11, for example, a bundling ring 42 is mounted as a mechanism member for restraining deformation in the radially outward direction of the tooth-shaped magnetic poles 23, 24 and the magnet ASSYs 41. Accordingly, the distal ends of the tooth-shaped magnetic poles 23, 24 or the magnet retaining members 41 are prevented from opening radially outwardly.

With such bundling ring 42, the effect of filling the resin between the magnet ASSYs 41 may be improved, and hence deformation of rotor may be restrained even when it is rotated at high-revolution.

Therefore, the air gap between the rotor 7 and the stator 8 may be reduced, and hence improvement of output is achieved.

In the eighth embodiment of the present invention, the structure of the rotor is reinforced by providing a mechanism for restraining displacement of the tooth-shaped magnetic poles 23, 24 and the magnet ASSYs 41 in the radially outward direction.

In FIG. 11, the bundling ring 42 is mounted as the mechanism member for restraining displacement on the outer periphery. By the effects of rigidity of the bundling ring 42 and fixation between the opposed surfaces of the magnet ASSYs 41 by the resin, higher rigidity than the related art is achieved, and hence the air gap between the rotor and the stator may be reduced, whereby improved output is achieved.

In addition to the configuration of any one of the first embodiment to the seventh embodiment, according to the eighth embodiment of the present invention, there is provided a restraining member formed of the bundling ring 42 for preventing the magnet ASSYs 41 as the magnetic element and the tooth-shaped magnetic poles 23, 24 from opening radially outwardly when rotating. Therefore, there is provided a rotor of a dynamo-electric machine in which circumferential deformation of the tooth-shaped magnetic poles having the magnetic elements for preventing magnetic flux leakage disposed thereon can be restrained accurately, strength against decomposition in the axial direction can reliably be increased, and the air gap between the rotor and the stator may be reduced, whereby improved output is achieved.

Ninth Embodiment

Figure 12:
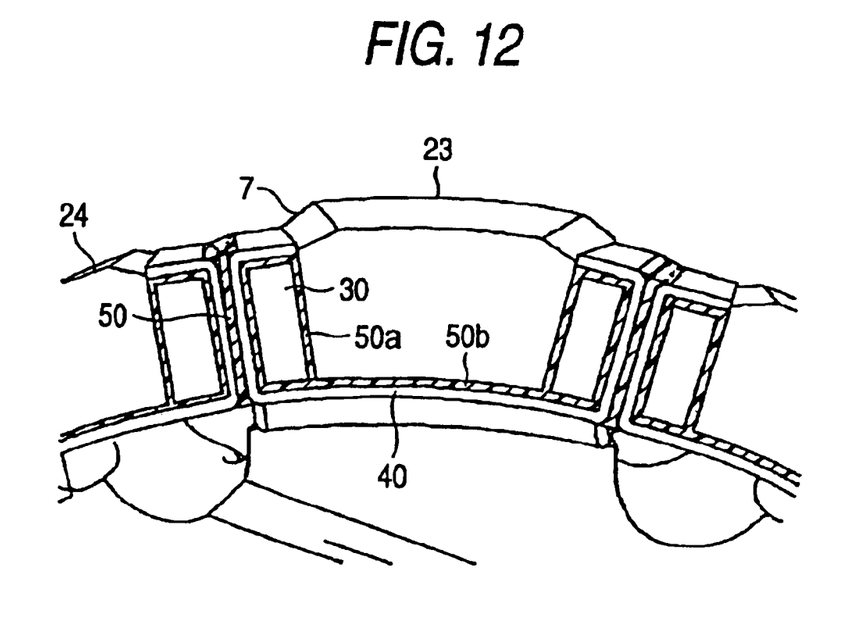
FIG. 12 is an enlarged cross-sectional view of the tooth-shaped magnetic poles according to a ninth embodiment of the present invention showing the structure of the tooth-shaped magnetic poles and the magnet ASSYs.

Referring now to FIG. 12, a ninth embodiment of the present invention will be described. FIG. 12 is an enlarged cross-sectional view of the tooth-shaped magnetic poles showing the structure of the tooth-shaped magnetic poles and the magnet ASSYs of the rotor.

In the ninth embodiment, configurations other than the specific configuration described here are the same as those in any one of the first embodiment to the eighth embodiment described above and provide the same effects. The identical reference numerals represent the identical or corresponding parts in the drawing.

In the ninth embodiment, as shown in FIG. 12, the above-described parts are fixed not only by filling the resin member 50 between the side surfaces of the magnet ASSYs 41, but also filling the same type of resin between the magnets 30 and the tooth-shaped magnetic poles 23, 24 as a resin member 50a, between the magnets 30 and the magnet retaining members 40 as a resin members 50b and between the bundling ring 42 (FIG. 11) and the rotor 7 (not shown).

Consequently, the above-described parts are firmly fixed with respect to each other, and hence a high strength is obtained.

In addition, since the same type of resin is used, conditions such as heat expansion are the same, and hence cracking of resin may be avoided.

In addition, since the resin to be filled may be shared, the filling step may be shared in comparison with a case in which a different resin is filled between the magnets 30 and the tooth-shaped magnetic poles 23, 24 and hence the number of steps may be reduced, whereby the cost reduction is achieved.

In the ninth embodiment of the present invention, as shown in FIG. 12, fixation is made by filling the same type of resin between the magnets 30 and the tooth-shaped magnetic poles 23, 24, between the magnets 30 and the magnet retaining members 40, between the magnet retaining members 40 and the tooth-shaped magnetic poles 23, 24, and between the magnet ASSYs 41 and the tooth-shaped magnetic poles 23, 24 and an external restraining member 42.

Accordingly, since fixation is achieved not only between the magnet ASSYs 41, but also over the entire magnetic pole section of the rotor, strength thereof is increased.

In addition, since the same type of resin is used, conditions such as heat expansion are the same, and hence cracking of resin may be avoided.

Furthermore, since hardening process may be completed simply by filling the resin to all the aforementioned portions with one operation, time required for manufacturing may be reduced in comparison with a case in which many types of resin are used, whereby productivity is improved.

In addition to the configurations in any one of the first embodiment to the eighth embodiment, according to the ninth embodiment, the resin member 50 which is to be filled between the magnet ASSYs 41 as the magnetic elements is also filled between the magnets 30 and the tooth-shaped magnetic poles 23, 24, between the magnets 30 and the magnet retaining members 40, between the magnet ASSYs 41 as the magnetic elements and the restraining members formed of magnetic poles 23, 24 and the bundling ring 42 (FIG. 11), and between the tooth-shaped magnetic poles 23, 24 and the restraining members. Therefore, there is provided a rotor of a dynamo-electric machine in which circumferential deformation of the tooth-shaped magnetic poles having the magnetic elements for preventing magnetic flux leakage disposed thereon can be restrained accurately, strength against decomposition in the axial direction can reliably be increased, and the rotor is reinforced as a hole, whereby operation of filling the resin member may be simplified.

While the presently preferred embodiments of the present invention have been shown and described.

It is to be understood that these disclosure are for the purpose of illustration and that various changes and modifications may be made without departing from the scope of the invention as set forth in the appended claims.

What is claimed is:

1. A rotor of a dynamo-electric machine comprising:

a rotor coil for generating magnetic flux; and a pole core provided so as to cover the rotor coil, the pole core comprising a first pole core body and a second pole core body formed with tooth-shaped magnetic poles projecting therefrom so as to mesh alternately with each other, magnetic elements, the magnetic elements comprising magnets disposed on both side surfaces of the tooth-shaped magnetic poles for reducing magnetic flux leakage from between the side surfaces of the adjacent tooth-shaped magnetic poles, and a magnet retaining member for supporting the magnets on the tooth-shaped magnetic-pole; and resin members filled between opposed surfaces of the magnetic elements.

2. A rotor of a dynamo-electric machine according to claim 1, wherein the distance between the opposed surfaces of the adjacent magnetic elements is larger on the side of the outer periphery of the rotor than the side of the inner periphery thereof.

3. A rotor of a dynamo-electric machine according to claim 1, wherein the opposed surfaces of the adjacent magnetic elements are disposed in parallel.

4. A rotor of a dynamo-electric machine according to claim 1, wherein the thickness of resin layer formed by filling a resin member is larger at the portion between the opposed surfaces of the magnetic elements than the thickness of the resin layer formed at other portions.

5. A rotor of a dynamo-electric machine according to claim 1, wherein fixation between the magnetic elements and the resin members is reinforced by increasing roughness of the surfaces of the magnet retaining members.

6. A rotor of a dynamo-electric machine according to claim 1, wherein entrance of the resin between the magnetic elements is facilitated by forming grooves on the opposed surfaces of the magnetic elements.

7. A rotor of a dynamo-electric machine according to claim 1, wherein the magnetic elements and the inner peripheral surfaces of the tooth-shaped magnetic poles are fixed in the adhered state.

8. A rotor of a dynamo-electric machine according to claim 1, further comprising a restraining member for preventing the magnetic elements and the tooth-shaped magnetic poles from opening radially outwardly when rotating.

9. A rotor of a dynamo-electric machine according to claim 1, wherein the resin member to be filled between the magnetic elements is also filled between the magnets and the tooth-shaped magnetic poles, between the magnets and the magnet retaining members, between the magnetic elements and the restraining members, and between the tooth-shaped magnetic poles and the restraining members.

* * * * *